United States Patent [19]

Muroya et al.

[11] Patent Number: 4,652,934
[45] Date of Patent: Mar. 24, 1987

[54] FACSIMILE TRANSCEIVER EQUIPPED WITH BROADCASTING FEATURE

[75] Inventors: Hideki Muroya; Toraichi Sirakawa, both of Yokohama, Japan

[73] Assignee: Hitachi, Ltd., Tokyo, Japan

[21] Appl. No.: 844,114

[22] Filed: Mar. 26, 1986

[30] Foreign Application Priority Data

Mar. 27, 1985 [JP] Japan .................................. 60-60578

[51] Int. Cl.⁴ .............................................. H04N 1/40
[52] U.S. Cl. .................... 358/260; 358/280; 358/286
[58] Field of Search ............... 358/260, 261, 280, 284, 358/256, 286, 287, 288, 293; 382/56, 47, 54

[56] References Cited

U.S. PATENT DOCUMENTS

| 4,090,222 | 5/1978 | Nakagome et al. | 358/280 |
| 4,386,373 | 5/1983 | Kondo et al. | 358/260 |
| 4,568,973 | 2/1986 | Ishida | 358/287 |
| 4,607,289 | 8/1986 | Kurokawa | 358/286 |

FOREIGN PATENT DOCUMENTS 9204377 9/1984 Japan .
60-32473 2/1985 Japan .................................. 358/286

Primary Examiner—Edward L. Coles, Sr.
Attorney, Agent, or Firm—Antonelli, Terry & Wands

[57] ABSTRACT

A facsimile transceiver equipped with a broadcasting feature wherein a transmission data is temporarily stored in a memory and thereafter the data is successively transmitted to a plurality of destinations. The facsimile transceiver includes a unit for expanding and reproducing once compressed and stored transmission data, a switch unit provided at the input side of a scanning resolution converter for selecting either the data from the expansion and reproduction unit or the transmission data from a scanner. In case broadcast is conducted using the facsimile transceiver, the expanded and reproduced transmission data is inputted to the scanning resolution converter to transmit it using the same method as of one-to-one communication. Thus, it is possible to use any type of a facsimile transceiver as a broadcasting reception terminal, and to broadcast to a broadcasting reception terminal in the same mode as of one-to-one communication.

3 Claims, 1 Drawing Figure

FACSIMILE TRANSCEIVER EQUIPPED WITH BROADCASTING FEATURE

BACKGROUND OF THE INVENTION

The present invention relates to a facsimile transceiver equipped with a broadcasting feature, and more particularly to a facsimile transceiver equipped with a broadcasting feature wherein transmission data is temporarily stored in a memory and thereafter the data is successively transmitted to a plurality of destinations.

Generally in a facsimile transceiver with a broadcasting feature, read-out transmission data is subjected to data compression to store it in a memory and thereafter, the data in the memory is successively read and transmitted. In an alternative method, readout data may not be subjected to data compression to store it in a memory. In this case, however, a memory capacity as large as about ten times is required as compared with that under data compression. Thus, this method is not practical and cannot be employed.

Facsimile transceivers equipped with a broadcasting feature as above are disclosed in Japanese Patent Unexamined Publications Nos. 204377/84 and 32473/85 and else.

The problems associated with the prior art facsimile transceiver equipped with a broadcasting feature are that all of the various types of facsimile transceivers now available are not usable as broadcasting reception terminals.

There are various types of facsimile transceives now available, such as those operating under G3, G2, FM6 or other mode. Even G3 facsimile transceivers have various functions regarding such as a record paper size (A4, B4), a coding mode (Modified Huffman, Modified Read), a scanning resolution (3.85 line/mm, 7.5 line/mm), a minimum transmission time (5 msec, 10 msec, 20 msec, 40 msec and so on).

According to the prior art, data with its redundant codes removed is compressed to store it in a memory and thereafter the stored data is read and transmitted. Therefore, only G3 type facsimile transceivers can serve as broadcasting reception terminals. Furthermore, depending on the selection of various modes (record paper size, coding mode, scanning resolution, minimum transmission time), some of G3 facsimile transceivers cannot be used as broadcasting reception terminals.

The facsimile transceiver of the type (disclosed in Japanese Patent Unexamined Publication No. 32473/85) is provided with a document paper size detector for outputting information regarding a document size to be broadcast and a terminal function storage section for storing terminal information such as a compression mode for each destination. Based on the information from the document paper-size detector and the terminal function storage section, transmission data can be stored and transmitted in the mode (lowest level function) common to all the destinations even if the functions of the destinations to which data is transmitted are different from each other. With such an arrangement, it is possible to use any type of G3 facsimile transceivers as broadcasting reception terminals. However, for example, in case that a B4 document is to be transmitted and there are both B4 size and A4 size G3 facsimile transceivers at the broadcasting destination side, transmission data is reduced from B4 to A4 at a scanning resolution converter (or only the portion of A4 size within B4 size is used at the same scale) and thereafter, the redundant codes are removed therefrom at an information compression section to store it in a memory. The stored transmission data is successively read and transmitted via a modem over a telephone line. Therefore, in spite of use of a B4 size G3 facsimile transceiver at a broadcasting reception terminal, the document is recorded at the reduced scale of A4 (or corresponding A4 dimension of the same scale).

In other words, it cannot be expected to transmit a B4 document and record it at the same scale even when and the destination has a B4 size G3 facsimile transceiver, in spite of the fact that such transmission and recording can be effected in the case of one-to-one communication (not broadcasting communication).

SUMMARY OF THE INVENTION

It is an object of the present invention to provide a facsimile transceiver equipped with a broadcasting feature capable of using any type of a facsimile transceiver as a broadcasting reception terminal.

It is another object of the present invention to provide a facsimile transceiver equipped with a broadcasting feature capable of broadcasting to a broadcasting reception terminal in the same mode as of one-to-one communication.

To achieve the above objects, the facsimile transceiver equipped with a broadcasting feature according to the present invention comprises means for expanding and reproducing once compressed and stored transmission data; switch means provided at the input side of a scanning resolution converter for selecting either the data from said expansion and reproduction means or the transmission data from a scanning section. In case broadcasting is conducted, the expanded and reproduced transmission data is inputted to the scanning resolution converter, thus enabling a transmission with the same method as of one-to-one communication.

DESCRIPTION OF THE PREFERRED EMBODIMENT

Figure 1:
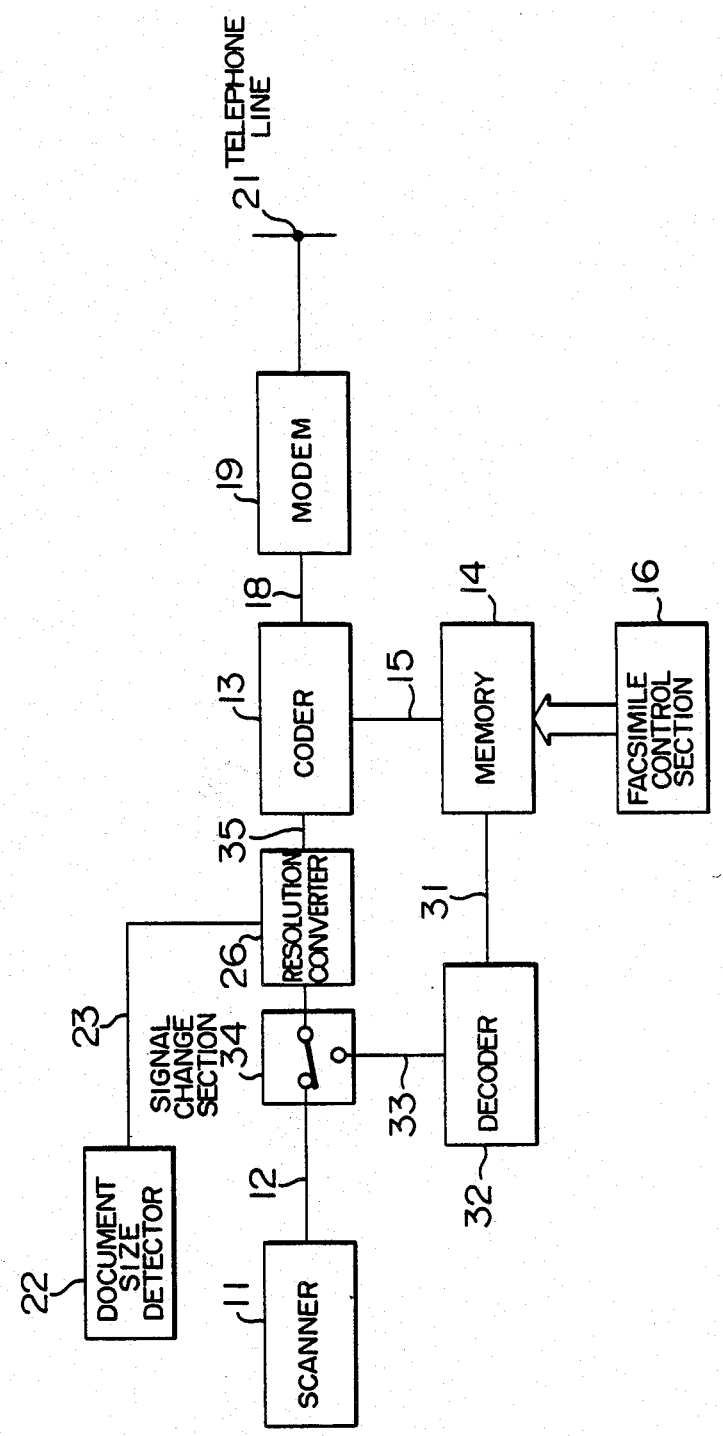
FIG. 1 is a block diagram showing the facsimile transceiver according to the present invention.

Referring to FIG. 1, a document to be broadcast is read at a scanner 11 having a 2.6K bit CCD sensor for example. A video signal 12 outputted from the scanner 11 is inputted via a signal change section 34 to a resolution converter 26.

The resolution converter 26 processes the video signal 12 based on a document size information from a document size detector 22. In particular, the document size detector 22 discriminates document sizes A4, B4 and A3 by detecting for example the width of a document guide slidably mounted on the facsimile transceiver. The resolution converter 26 converts the scanning resolution into a proper one based on a document size information from the document size detector 22 to make the transmission data have a desired size. For instance, to reduce an A3 size to a B4 size, the conversion of scanning resolution by the resolution converter 26 is performed for example by omitting one bit from every 8 bits among the video signal 12 outputted from the scanner 12.

The transmission data subjected to necessary conversion at the resolution converter 26 is subjected to a removal of redundant codes and compressed at a coder 13. The data compression by the coder 13 is performed by coding the transmission data in accordance with the number of bits of the white or black bit length detected for example by a transition detector which detects a transition from white to black or vice versa of the transmission data. The coding method may be a method conforming with Recommendation T4 (G3) of CCITT or any other method so long as it can improve storage efficiency.

The coding data 15 is stored in a memory 14 which may be constructed of a DRAM having a memory capacity of about 1 M bits wherein the compressed data is sequentially stored.

To broadcast the transmission data, the coding data stored in the memory 14 is read and transferred to a decoder 32 whereat a video signal 33 is reproduced by quite the reverse procedure performed at the coder 13. Thus, the video signal 33 becomes the same video signal 12 as that read by the scanner 11. During the broadcasting operation, the signal change section 34 is changed to a state that the video signal 33 from the decoder 32 is inputted to the resolution converter 26. As a result, the video signal 33 is processed at the resolution converter 13 so as to conform with the function of the destination. Since the destination function can be readily known by the transmission control procedure without a terminal function storage section, it is possible during the broadcasting to carry out a most suitable scanning resolution conversion for the function of each broadcasting reception terminal. In this case, the data compression at the coder 13 is performed in the same way as described above, i.e., the redundant codes are removed in a compression mode conforming with the destination function (however, in case that the destinations are G2 or FM6 mode facsimile transceivers, removal of redundant codes are not carried out) to obtain a transmit data 18 which is transmitted via a modem 19 over a telephone line 21.

The above sequential operations are carried out one after another in accordance with commands sent from a facsimile control section, and repeated a number of times corresponding to the number of destinations.

According to the present invention, it is not necessary to provide a terminal function storage section for storing such as a compression mode of a broadcasting reception terminal. Furthermore, the difference of the transmission mode between a one-to-one transmission and a broadcasting is obviated and the restrictions on the destination facsimile transceiver are eliminated. Thus, it is possible to more effectively utilize the broadcasting feature of the facsimile transceiver.

We claim:

1. A facsimile transceiver comprising:
    a scanner for reading a document and outputting a video signal;
    a resolution converter for converting the resolution of said video signal into a desired one;
    a coder for compressing and coding a transmission data subjected to a resolution conversion by said resolution converter;
    a memory for storing said compressed transmission data form said coder;
    a decoder for reading said compressed transmission data stored in said memory and reproducing said video signal before said compression;
    a signal change section for changing an input to said resolution converter by selecting either said video signal from said scanner or said video signal from said decoder;
    a modem for transmitting a transmission data over a telephone line; and
    a control section for controlling while reading said document to change said signal change section so as for said video signal from said scanner to be inputted to said resolution converter, and to store said compressed transmission data from said coder into said memory, and controlling while broadcasting to change said signal change section so as for said video signal from said decoder to be inputted to said resolution converter, and to transmit said transmission data from said coder via said modem to said telephone line.

2. A facsimile transceiver comprising:
    a scanner for reading a document and outputting a video signal;
    a document size detector for detecting the size of said document;
    a resolution converter for converting the resolution of said video signal into a desired one;
    a coder for compressing and coding a transmission data subjected to a resolution conversion by said resolution converter;
    a memory for storing said compressed transmission data from said coder;
    a decoder for reading said compressed transmission data stored in said memory and reproducing said video signal before said compression;
    a signal change section for changing an input to said resolution converter by selecting either said video signal from said scanner or said video signal from said decoder;
    a modem for transmitting a transmission data over a telephone line; and
    a control section for controlling while reading said document to change said signal change section so as for said video signal from said scanner to be inputted to said resolution converter, said resolution converter performing the resolution conversion of said video signal based on a document size information from said document size detector, and to store said compressed transmission data from said coder into said memory, and controlling while broadcasting to change said signal change section so as for said video signal from said data reproduction section to be inputted to said resolution converter, and to transmit said transmission data from said coder via said modem to said telephone line.

3. A facsimile transceiver comprising:
    a scanner for reading a document and outputting a video signal;
    a resolution converter for converting the resolution of said video signal into a desired one;
    a coder for compressing and coding a transmission data subjected to a resolution conversion by said resolution converter;
    a memory for storing said compressed transmission data from said data compression section;
    a decoder for reading said compressed transmission data stored in said memory and reproducing said video signal before said compression;
    a signal change section for changing an input to said resolution converter by selecting either said video signal from said scanner or said video signal from said decoder;

a modem for transmitting a transmission data over a telephone line; and a control section for controlling while reading said document to change said signal change section so as for said video signal from said scanner to be inputted to said resolution converter, and to store said compressed transmission data from said coder into said memory, and controlling while broadcasting to change said signal change section so as for said video signal from said decoder to be inputted to said resolution converter, and to transmit said transmission data from said coder via said modem to said telephone line without compressing and coding said video signal by said coder.

* * * * *